Dec. 31, 1935.  M. SANDFORT  2,026,254
RADIO DIRECTION FINDER
Filed Feb. 2, 1932  2 Sheets-Sheet 1

INVENTOR,
MARK SANDFORT.
BY Donald K. Lippincott
ATTORNEY.

Dec. 31, 1935.　　　　M. SANDFORT　　　　2,026,254
RADIO DIRECTION FINDER
Filed Feb. 2, 1932　　　　2 Sheets-Sheet 2
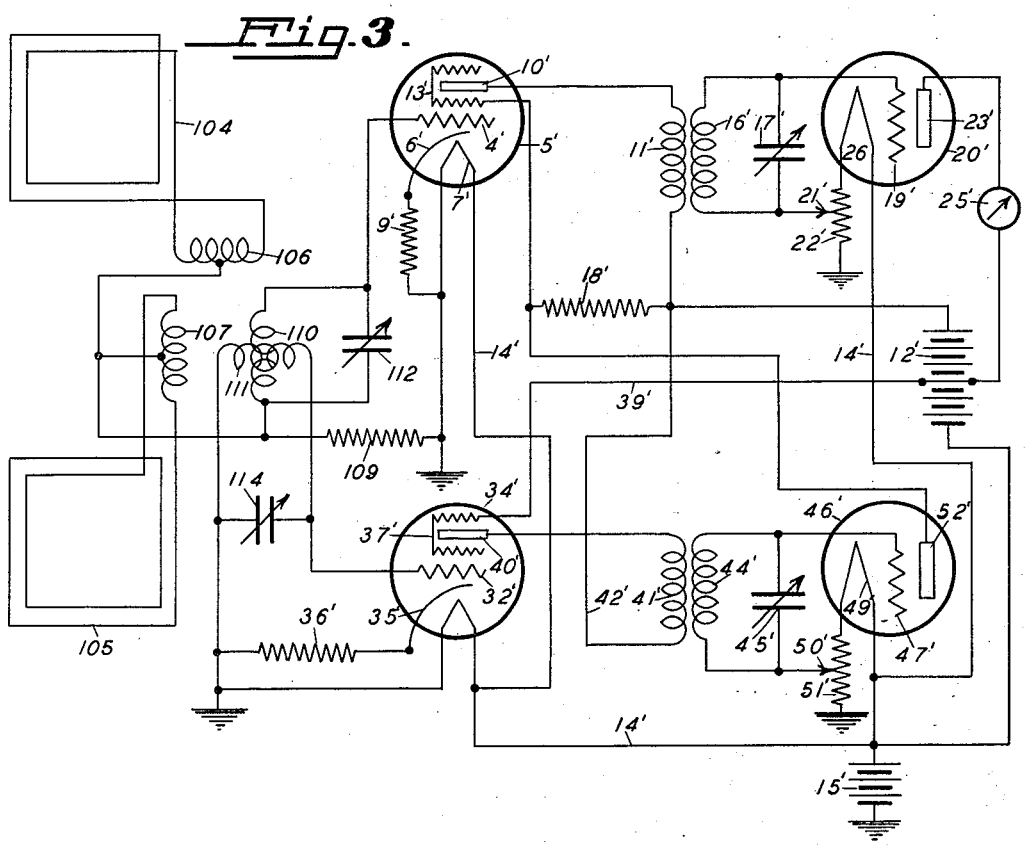
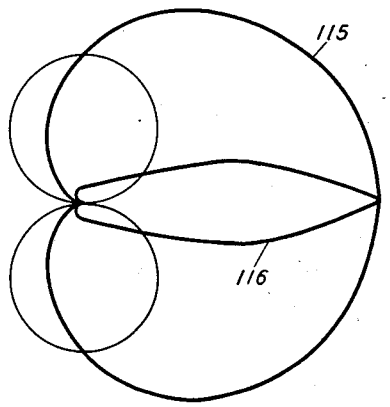
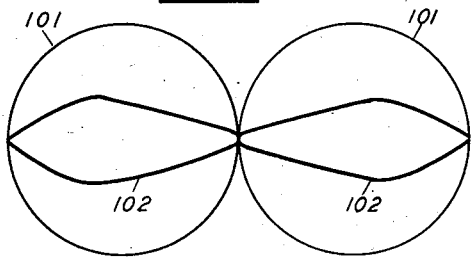
INVENTOR,
MARK SANDFORT.
BY Donald K. Lippincott
ATTORNEY Patented Dec. 31, 1935

2,026,254

UNITED STATES PATENT OFFICE 2,026,254

RADIO DIRECTION FINDER

Mark Sandfort, Berkeley, Calif., assignor to Henry N. Wolff, San Francisco, Calif.

Application February 2, 1932, Serial No. 590,377

18 Claims. (Cl. 250—11)

My invention relates to radio direction finders or radio compasses.

Among the objects of this invention are: to provide a radio direction finder wherein the position of maximum signal is determined, rather than the position of minimum signal; to provide a direction finder whose indications are substantially unimpaired by noise; to provide a direction finder whose indications are visual rather than aural; to provide a direction finder giving sharp indications of the direction of maximum signal; to provide a direction finder which will not give false indications owing to the cessation of the received signals; to provide a radio direction finder which will give a sharply defined maximum indication in a single direction; and to provide a direction finder which will indicate both the sense and the exact bearing of an incoming signal in a single observation.

Other objects of my invention will be apparent or will be specifically pointed out in the description forming a part of this specification, but I do not limit myself to the embodiment of my invention herein described, as various forms may be adopted within the scope of the claims.

Radio compasses or direction finders ordinarily operate upon the principle of the coil or loop antenna. This type of antenna system is characterized by the fact that its response to radio signals of given intensity is proportional to the cosine of the angle between the plane of the antenna and the line along which the radio wave is propagated. This is true whether the direction finder operates with a movable loop, or with a pair of fixed loops coupled to a movable radiogoniometer coil. In either case, the reception pattern is a figure 8, or two tangent circles. Observations of the direction of a signal are made by turning the antenna or equivalent goniometer coil to the position at which minimum signals are received, since at this point the rate of change of received signal intensity with changing angle of reception is greatest.

The indication of such a direction finder may under favorable conditions, be extremely accurate, but there are a number of disadvantages to the system. Among these disadvantages are the fact that the fainter the signal received, the broader becomes the angle of the nul or position of apparent zero signal. Furthermore, a false indication may be given due to a temporary cessation of the signal, giving the operator the impression that the angle at which the receiving pickup was set at the time that the signal ceased is the nul position. Interferent noise, either in the form of atmospherics or of extraneous sound, has the same effect as a reduction in signal strength, causing an apparent broadening of the nul.

Furthermore, it will be obvious from the shape of the reception pattern of the loop antenna, that the indications given thereby are merely of the line along which the received signals are propagated, and tell nothing of the direction in which they are propagated along this line. In order to obtain the "sense" in which the reading is to be taken, it is necessary to make a second reading giving the general direction from which the signals proceed, this latter reading being too inaccurate to be taken as a bearing.

The system of my invention is designed to obviate these difficulties. Broadly considered the method of my invention comprises the steps of receiving the signal whose direction is to be located upon two antenna systems having different directional characteristics, and utilizing the signal as received upon one of these systems for modifying the indications of the signal as received upon the other antenna system. One of the antenna systems, which may be termed a primary system, may be nondirectional, bidirectional, as is the case with the ordinary loop antenna, or unidirectional, and is connected to any suitable means for giving either an aural or a visual indication. The secondary antenna system is of a type adapted sharply to directionalize the received signal, either a single loop antenna, of the movable type, or a pair of crossed loops coupled to a movable radiogoniometer coil being satisfactory. The signal received by the primary antenna is preferably amplified, and the variation in the indication is effected by causing the signal as received by the secondary antenna to vary the gain of the amplifier. If the primary antenna be nondirectional or bidirectional the entire apparatus will indicate, by maximum readings, a forward and reverse course, i. e., will indicate merely the line along which the received signal is propagated and not its direction of propagation along this line. If, however, the primary system be unidirectional the apparatus will indicate, with a single observation, the azimuth from which the signal is received.

Referring to the drawings:

Figure 3 is a circuit diagram of a unidirectional pickup circuit utilizing fixed loops and a pair of crossed radiogoniometer coils in connection with a circuit substantially similar to that of Figure 1.

Figure 4 is a polar diagram showing the reception pattern of the circuit of Figure 2 in comparison with the figure 8 reception pattern of the ordinary loop radio compass.

Figure 5 is a polar diagram showing the reception pattern of the arrangement illustrated in Figure 3.

Figure 1:
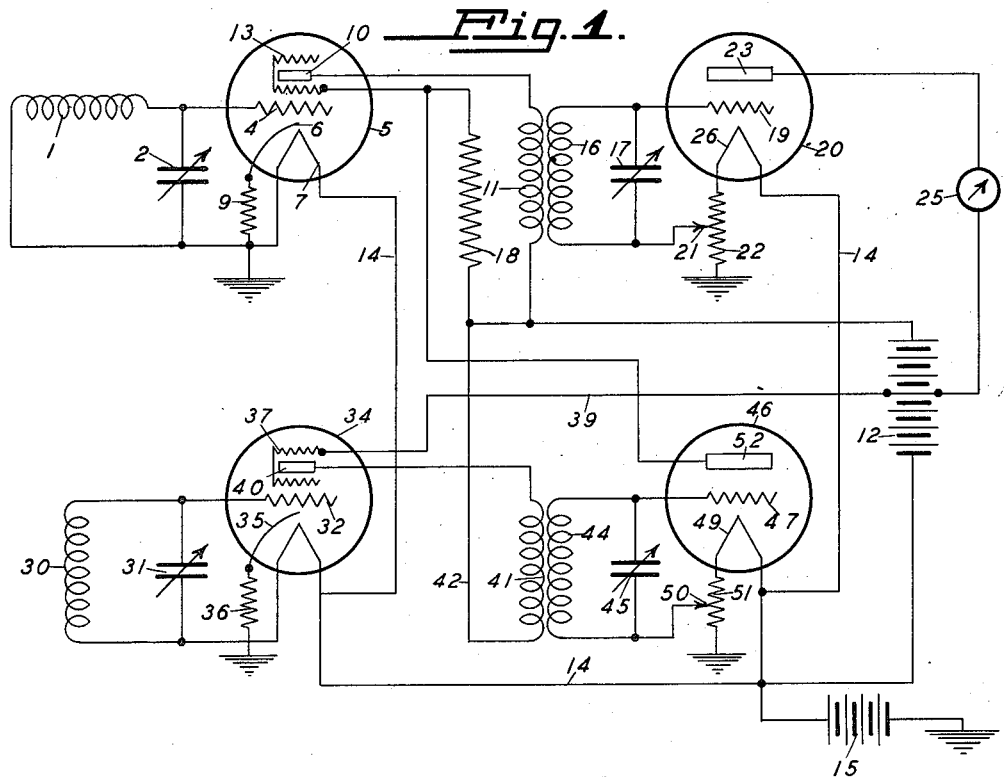
Figure 1 is a connection diagram showing one embodiment of my invention, utilizing crossed directional pickup coils as a receiving system.

A simple embodiment of my invention is shown in the circuit diagram of Figure 1. A pickup coil 1, which is tuned by a variable condenser 2, may be either a loop antenna, the inductance coil of a capacity type antenna, or the coil of a radiogoniometer which is coupled to a crossed loop system of the Bellini and Tossi or equivalent type. One terminal of the pickup coil is connected to the grid 4 of a screen grid tetrode 5. The cathode 6 is raised to emitting temperature by a heater 7, and proper grid bias is applied to the tube by the potential drop in a resistor 9 which connects the cathode to the heater circuit.

The tube 5 acts as a radio frequency amplifier, the plate 10 being connected through the primary 11 of a radio frequency transformer to a plate battery or other source 12. The screen grid 13 of the tube is connected to the positive terminal of the same source 12 through a resistor 18, the value of this resistor being so chosen as to reduce the potential on the grid 13 to the proper biasing value.

The negative end of the plate battery connects to one side of a heater circuit 14, through which a filament battery 15 supplies all of the tubes in the device. The other side of the battery 15 is grounded, as is one side of the heater of the tube. It will be seen that the plate current of the tube must flow through batteries 12, 15, the ground circuit, and the resistor 9 to reach the cathode, this providing the bias drop through the resistor before mentioned.

The primary 11 is coupled to a secondary coil 16 which is tuned by a variable condenser 17 connected across it. One side of the parallel-tuned circuit thus formed connects to the grid 19 of a triode detector tube 20. The other side of the tuned circuit connects through a potentiometer connection 21 to a biasing resistor 22.

The plate 23 of the tube connects through a milliammeter 25 or other suitable indicator to the battery 12, and thence through the common filament circuit 14 to the filament 26 of the tube. The return plate current through the resistor 22 provides a biasing drop as in the case of the preceding tube, the potentiometer connection 21 being adjusted to the optimum point for plate detection.

It will be seen that the circuit as thus far described is adapted to work satisfactorily as a radio compass or direction finder of the usual type, it being understood that suitable shielding and by-passing should be provided in accordance with standard practice, this shielding and by-passing being omitted in the drawings in order to prevent undue complications, since it forms no part of this invention and is well known in the art.

A second directional pickup coil 30 is mounted substantially perpendicular to the coil 1. This second coil will normally be made of the same general type as the coil 1 if the latter be directional; i. e., if the coil 1 be a loop antenna the coil 30 will be a similar loop mounted at right angles, thereto, while if the coil 1 be the pickup coil of a radiogoniometer the coil 30 will also be a radiogoniometer pickup coil mounted on the same shaft at 90° to the coil 1. The coil 30 is tuned by a variable condenser 31, and the tuned circuit connects to the grid 32 of a tetrode 34, the other side of the circuit connecting to the cathode 35 through a biasing resistor 36 in a manner similar to the connection to the tube 5.

The shield grid 37 is connected through the lead 39 to a tap on the battery 12. The plate 40 of the tube connects through a primary 41 and thence through a lead 42 to the high potential end of the battery.

Coupled with the primary coil 41 is a secondary 44 which is tuned by a variable condenser 45. A detector tube 46 is connected across the resonant circuit thus formed, the grid 47 being connected to one side of the circuit and the filament 49 to the other through a potentiometer tap 50 on a resistor 51. The proper bias for plate detection is applied to the grid through this potentiometer connection in the same manner as that for the tube 20. The plate 52 of the tube 46 connects directly to the screen grid 13 of the tube 5, the return to the source 12 being through the resistor 18.

The operation of the circuit is as follows: The reception pattern of each of the pickup coils 1 and 30, is a figure 8, with the axes of the two reception patterns substantially perpendicular, that is, when the coil 1 is so oriented that the signal received by it from a given source is the maximum, the signal received from the same source by the coil 30 is zero, and vice versa.

Assuming the coils to be so oriented that both respond to an incoming signal from a selected source, this signal will be amplified by the tube 5 and passed on to the detector tube 20, the latter being preferably biased to cutoff, so that the incoming signal increases its plate current, giving a reading on the indicator 25. The same signal, as received on the coil 30, is amplified by the tube 34 and passed on to the tube 46, where it is also detected.

The tube 46 is also biased nearly to cutoff. The received signal increases the plate current, which flows through the resistor 18 increasing the voltage drop therein. This decreases the positive bias on the screen grid 13, increasing the effective plate impedance of the tube 5 and decreasing its effective amplification, thereby reducing the reading of the indicator 25.

As the orientation of the coils 1 and 30 is changed, so that the coil 1 approaches the position of maximum response, the coil 30 approaches position of minimum response. The plate current drawn by the tube 46 therefore decreases, permitting the bias on the screen grid 13 to approach normal and increasing the effective amplification of the tube 5. When the coil 30 actually reaches the position of zero reception the tube 46 ceases to affect the amplification of the tube 5, which passes the signal picked up by the coil 1 at full intensity on to the indicator 25, giving a maximum reading at this point. By proper adjustment of the potentiometer connections 21 and 50, the tube 5 can be made extremely sensitive to small changes in the signal received by the coil 30, and the maximum indication may be made extremely sharp.

It will, of course, be understood that additional stages of amplification may be used ahead of the detector tube in this and the other embodiments of my invention which will be described later, and that such well known expedients as ganging the variable condensers for convenience in tuning will usually be resorted to.

Figure 2:
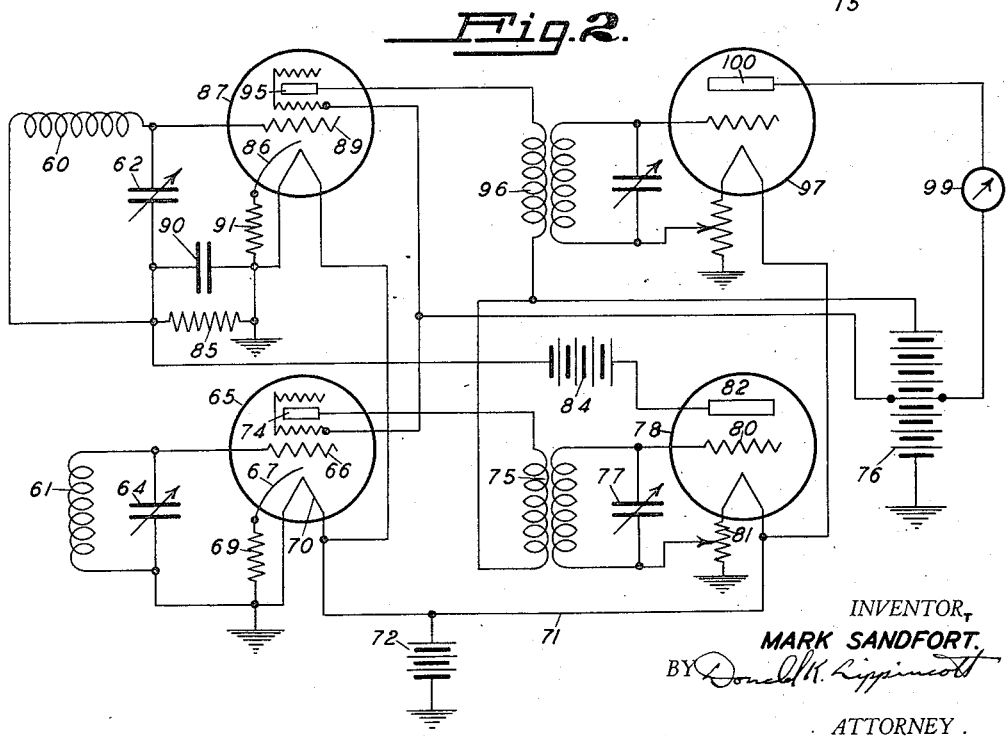
Figure 2 is a similar diagram showing a different circuit arrangement accomplishing substantially the same results.

Another circuit for accomplishing the same result is shown in Figure 2. In this case the same arrangement of crossed pickup coils 60 and 61, tuned by variable condensers 62 and 64, is used. Describing first, in this case, the connection of the circuit which controls the amplification of the signal, the tube 65 is connected with its grid 66 and cathode 67 across the pickup coil 61. A bias resistor 69 is provided as described before, and the heater 70 connects to a common filament circuit 71 supplied by a battery 72. The plate 74 connects through a radio frequency transformer 75 to the positive terminal of the B-battery 76, the transformer 75 being tuned by a variable condenser 77. The detector 78 is connected across the transformer 75, its grid 80 being biased by the potentiometer 81.

In this case, however, the plate 82 of the detector is supplied from a separate B-battery 84, this battery being connected between the plate and a resistor 85 whose other end is grounded. This resistor is also included in the circuit of the other pickup coil 60, being connected between the low potential end of this coil and the cathode 86 of an amplifier tube 87 whose grid 89 connects to the high potential end of the pickup coil. The resistor 85 is shunted by a by-pass condenser 90, and the biasing resistor 91, connected between the cathode 86 and ground, is of such magnitude that the tube 87 acts substantially in the manner of a "Class B amplifier", that is, the tube 87 is biased substantially to cutoff.

As a result of this arrangement, the tube 87 will amplify the signals picked up by the coil 60 when they arrive in such phase as to tend to swing the grid 89 positive, but will largely suppress that half of the wave tending to swing the grid negative. When a signal is being picked up simultaneously by the coil 61, plate current will flow in the detector tube 78 causing an increased drop in the resistor 85 and increasing the negative bias on the grid 89, so that a much more powerful positive swing is necessary in order that the tube 87 may pass current. The amplification of the tube 87 is therefore an inverse function of the intensity of the signals picked up by the coil 61.

The plate 95 of tube 87 connects through a tuned radio frequency transformer 96 to a detector tube 97. The detected impulses are indicated by a milliammeter 99, which is connected between the plate 100 of tube 97 and the battery 76.

As in the case of the circuit first described this arrangement leads to a reception pattern which shows an extremely sharp maximum. When the coil 61 is in the nul position the amplification of tube 87 is unaffected by the signals received. As soon, however, as the pickup coils are rotated to a position in which a signal is picked up by coil 61, the amplification of the tube 87 is greatly reduced, and with it the indication of the meter 99.

Figure 4 shows the reception pattern of the circuit shown in Figure 2, as plotted in polar coordinates. The curve 101 is the normal figure 8 reception pattern of the coil 60 when unaffected by signals picked up by the coil 61. Curve 102 shows the reception pattern of the entire system, from which it will be seen that the maximum is extremely sharp. By adding increased amplification ahead of the detector 78 this maximum may, if desired, be sharpened still further.

The reception pattern of the circuit of Figure 1 will be slightly different from that of the circuit of Figure 2, owing to the different shape of the screen grid characteristics. Furthermore, the use of different types of tubes in the circuit of Figure 2 will slightly modify the shape of the reception pattern, but in any case the sharp maximum indication is preserved if the proper bias potentials are applied. These potentials differ so much with various types of tubes, and may so readily be obtained by experiment, that exact specification of their magnitude appears to be unnecessary.

In Figure 3 is shown the circuit arrangement of a direction finder giving maximum indications along a single course, eliminating the uncertainty caused by the bidirectional indication of the ordinary radio compass. The figure shows a pair of crossed stationary loops 104, 105, which are connected to the primary coils 106, 107 respectively of a radiogoniometer. The midpoints of the two goniometer primaries are connected together and are grounded through a resistor 109. A pair of crossed secondary coils 110, 111 are mounted in the field of the goniometer primaries. Coil 110 is tuned by a variable condenser 112, while coil 111 is tuned by a variable condenser 114.

The two pickup coils are connected to a circuit which is practically identical with that shown in Figure 1, and whose elements are accordingly identified by similar reference characters distinguished by accents. The only essential difference is that the low potential side of the pickup coil 110 is connected to the junction of the two primary coils, and thence to the cathode 6' through the resistor 109. The connections of the secondary coil 111 to the tube 34' are the same as those of the coil 30 to the tube 34.

The effect of this arrangement is shown in the reception pattern of the device as illustrated in Figure 5. The two loops 104 and 105 act together as a capacity type antenna, giving a radio frequency voltage drop through the resistor 109. This superposes a circular reception pattern which is added to the normal figure 8 reception pattern of the coil 110 in such phase relation that a resultant pattern of cardioid form is produced as shown by curve 115. Signals received on the pickup coil 111 decrease the amplification of the tube 5', and modify the response of the milliammeter or other indicator 25' to give a polar diagram as shown in curve 116.

For many uses this last described arrangement is by far the most satisfactory of those shown. The cardioid reception pattern has long been used to indicate the sense of radio compass bearings, but its maximum has been so broad as to be of little use in actual direction indication and therefore it has been necessary to make a minimum reading to determine the line of the bearing and a maximum reading to determine its sense. The action of the signal picked up by the coil 111 is such as to make the maximum bearing very sharp instead of extremely broad as in the past. The reception from the reverse direction is so small that there is no possibility of a mistake, and a single reading, indicated by meter, gives all of the information required in observations of this kind.

I claim:

1. The method of radio direction finding which comprises the steps of collecting radio impulses directionally from two directions, amplifying the impulses received from one of said directions, and controlling the degree of amplification with the impulses received from the other direction.

2. The method of radio direction finding which comprises the steps of collecting radio impulses directionally from two directions, amplifying the impulses received from one of said directions, and utilizing the impulses received from the other direction to control the degree of amplification as an inverse function of the amplitude of the controlling impulses.

3. The method of radio direction finding which comprises the steps of collecting radio impulses directionally from two directions, amplifying the impulses received from one of said directions, utilizing the impulses received from the other direction to decrease the degree of amplification, and measuring the amplitude of the amplified signals.

4. A radio direction finder comprising a pair of pickup systems having dissimilar directional characteristics, one of said systems being adjustable to vary its direction of reception, an amplifier associated with the other of said systems, translating means connected to the output of said amplifier, and means responsive to the amplitude of signals as collected by said adjustable pickup system for controlling the gain of said amplifier.

5. A radio direction finder comprising a pair of pickup systems having dissimilar directional characteristics, one of said systems being adjustable to vary its direction of reception, indicating means connected to respond to signals received by the other of said pickup systems, and means responsive to the amplitude of said signals as collected by said adjustable pickup system for controlling the degree of response of said indicating means to said signals.

6. A radio direction finder comprising a pair of pickup systems having dissimilar directional characteristics, one of said systems being adjustable to vary its direction of reception, indicating means connected to respond to signals received by the other of said pickup systems, and means connected to said adjustable pickup system for reducing the degree of response of said indicating means in accordance with the amplitude with which said signals are received by said second mentioned pickup system.

7. A radio direction finder comprising a pair of crossed pickup coils mounted substantially at right angles with each other and rotatable about a common axis, an amplifier connected to one of said coils, indicating means connected to the output of said amplifier, and means connected to the other coil for controlling the gain of said amplified in response to the amplitude of signals received thereon.

8. A radio direction finder comprising a pair of crossed pickup coils mounted substantially at right angles with each other and rotatable about a common axis, an amplifier connected to one of said coils, indicating means connected to the output of said amplifier, and means connected to the other coil for controlling the bias of said amplifier to vary the gain thereof in response to the amplitude of signals received by said second mentioned coil.

9. A radio direction finder comprising a directional pickup coil, an amplifying vacuum tube connected to said coil and having a control element whose bias potential controls the effective amplification of said tube, a second pickup coil mounted substantially at right angles to said first mentioned coil, a vacuum tube connected to said coil, and means connected in the output circuit of said second tube for varying the bias of said control element in response to signals received on said second mentioned coil.

10. A radio direction finder comprising a directional pickup coil, an amplifier connected to said coil, an indicator connected to the output of said amplifier, a second pickup coil mounted substantially perpendicular to said first mentioned coil, an amplifier connected to said second coil, and means in the output of said second amplifier for biasing said first mentioned amplifier to vary the response of said indicator to signals received on said first coil.

11. A radio direction finder comprising a directional pickup coil, an amplifier connected to said coil, an indicator connected to the output of said amplifier, a second pickup coil mounted substantially perpendicular to said first mentioned coil, an amplifier connected to said second coil, and means in the output of said second amplifier for applying a negative bias to said first mentioned amplifier to reduce the gain thereof in response to signals received by said second pickup coil, whereby the response of said indicator to signals of a given strength is reduced by signals received on said second coil.

12. A radio direction finder comprising a directional pickup coil, a biased amplifier connected to said coil, a second pickup coil positioned substantially perpendicular to said first coil, a detector connected to said second coil, and a resistor connected in the output circuit of said detector, said resistor being so connected to said amplifier that a voltage drop through said resistance will vary the amplifier bias.

13. A radio direction finder comprising a directional pickup coil, a vacuum tube connected to amplify signals received by said coil and having a control element the bias of which varies the amplification of said tube, a resistor connected to said control element, a second pickup coil, and a detector connected thereto, the output of said detector being connected through said resistor to produce a voltage drop therein for varying the amplification of said amplifier tube.

14. The method of radio direction finding which comprises the steps of receiving and amplifying a radio signal, directionally receiving the same signal, and controlling the degree of amplification of said signal with the directionally received signal.

15. A radio direction finder comprising a unidirectional pickup system, a bidirectional pickup system mounted for maximum reception substantially perpendicular to the direction of maximum reception of said unidirectional system, indicating means connected to respond to signals received on said unidirectional system, and means connected to said bidirectional system for controlling the degree of response of said indicating means in accordance with the intensity of signals received on said bidirectional system.

16. A radio direction finder comprising a unidirectional pickup system, a bidirectional pickup system mounted for maximum reception substantially perpendicular to the direction of maximum reception of said unidirectional system, indicating means connected to respond to signals received on said unidirectional system, and means connected to said bidirectional system for reducing the response of said indicating means in accordance with the intensity of signals received on said unidirectional system.

17. The method of radio direction finding which comprises receiving a signal directionally so that the direction of minimum reception is sharply defined, receiving the same signal separately, indicating the intensity of the separately received signal, and reducing the indication in response to the directionally received signal in such measure that indication occurs only in substantially the direction of minimum reception.

18. The method of radio direction finding which comprises the steps of receiving a signal whose direction is to be determined directionally so that the azimuth of minimum reception is sharply defined, and utilizing the received signal to reduce a separately excited indication, whereby said indication reaches a sharply defined maximum in the azimuth of minimum reception of said signal.

MARK SANDFORT.